June 15, 1926.
A. M. SMALL
STORAGE BATTERY CONSTRUCTION
Filed Oct. 3, 1924
1,588,502
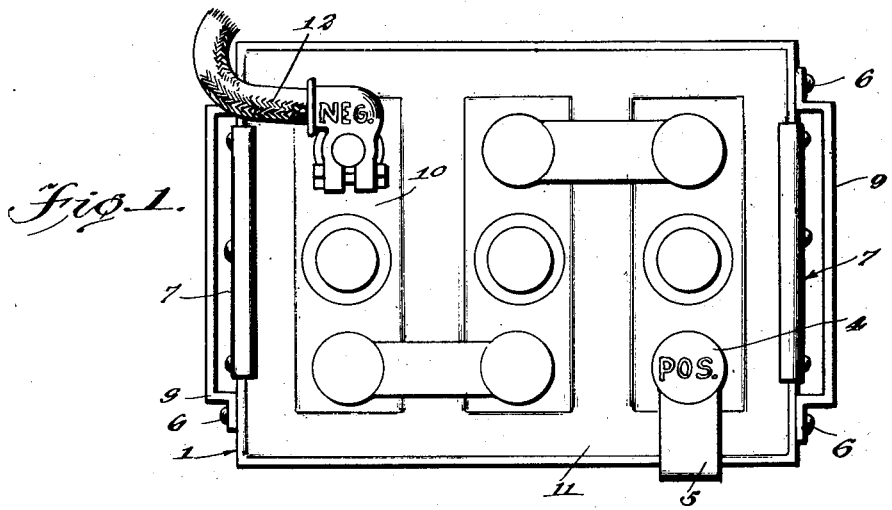
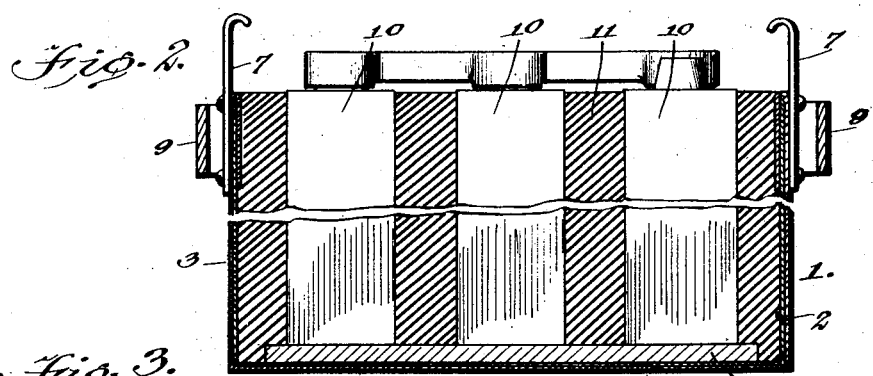
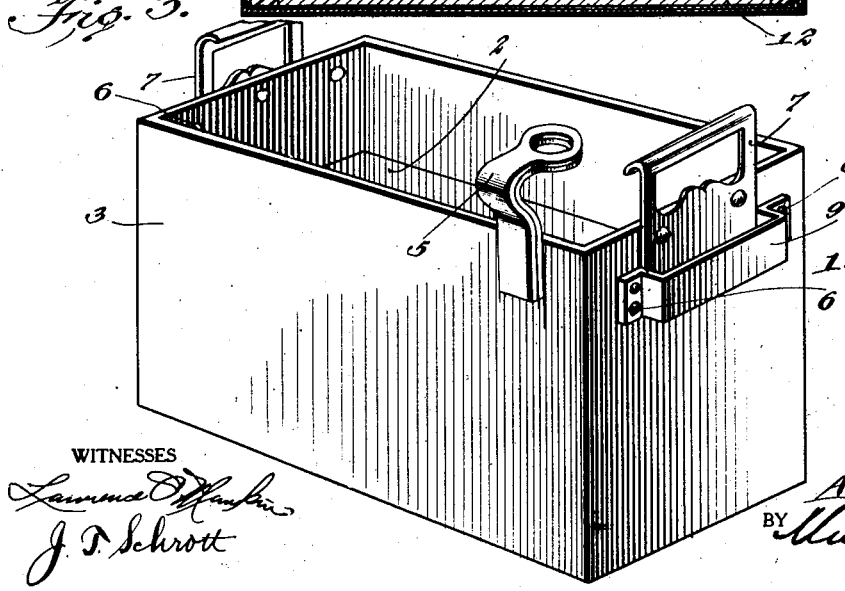
WITNESSES
INVENTOR
A. M. Small,
BY
ATTORNEYS Patented June 15, 1926.

1,588,502

UNITED STATES PATENT OFFICE.

ARTHUR MARTIN SMALL, OF MIDDLETOWN, OHIO.

STORAGE-BATTERY CONSTRUCTION.

Application filed October 3, 1924. Serial No. 741,439.

This invention relates to improvements in storage battery constructions and it consists of the combinations and arrangements herein described and claimed.

An object of the invention is to provide a storage battery of such construction that the much too prevalent corroding of positive terminals, the breaking of jars, leaking of the electrolyte and soaking of the wood case and other difficulties now experienced are totally eliminated, thereby producing a storage battery from which much greater satisfaction in use may be expected.

Another object of the invention is to provide a metallic, lead-coated case for the battery to which coating the positive terminal is grounded, the battery case also being furnished with suitable hangers by which it may be suspended from the chassis of a motor vehicle, thereby providing a positive connection of the positive terminal and also preventing corrosion at said terminal.

Other objects and advantages appear in the following specification, reference being had to the accompanying drawing, in which—

Figure 1 is a plan view of the improved storage battery.

Figure 2 is a central longitudinal section thereof.

Figure 3 is a detail perspective view of the improved battery casing.

In carrying out the invention provision is made of a case generally designated 1. This case, contrary to the usual construction, consists of an iron or other box 2 which is completely covered on the outside with a lead coating 3. This coating is carried over the edge of the box (Fig. 2) and down on the inside as far as may be desired.

The drawing shows the lead coating extending a relatively short distance down the inside of the box 2, but if it be desired to make the coating of the iron box 2 complete the coating may be carried down to and over the bottom.

The purpose of the lead coating is to protect the iron case from contact with any substance which would cause corrosion thereof. The lead coating also serves as a positive terminal of the battery in that the true positive terminal 4 is grounded to the lead coating by means of a strip 5.

Suitably fastened to the ends of the case 1 (Fig. 3) as by means of rivets 6 are hangers 9 by which the storage battery may be suspended from the chassis of the motor vehicle by which it is intended to be carried. In practice the design of the hangers will be a matter in which considerable variation must be permitted so that the various makes of motor vehicles can be accommodated. Inasmuch as the positive terminal 4 is grounded to the case 1 it follows that the hanging of the case upon the chassis ultimately grounds the positive terminal through the chassis. The usual positive wire and terminal are eliminated and the arrangement adopted in turn eliminates the usual corrosion at the positive terminal.

Positive terminal corrosion presents a difficulty which is yet to be overcome in storage battery construction. It is common knowledge that corrosion persistently occurs at the positive terminal. The positive polarity of the battery has something to do with this, but it is more the action of dilute sulphuric acid upon the brass lug usually used at the terminal than the action of the electric current that produces the corrosion. It is this acid action that causes a decomposition of the brass, producing a deposit of copper sulphate, commonly designated "corrosion". Lead is impervious to the action of the electrolyte, hence by using lead at all places where acid would likely reach metal around the positive terminal the damage of corrosion is permanently avoided.

In addition to the hangers 9 the case is fitted with handles 7 by means of which the battery is lifted and carried about. The jars or cells 10 of the storage battery are rigidly held in position in the case 1 by a filler 11 of such compound as is usually employed in storage battery work. The jars are set in the desired positions in the case 1 and the compound is poured under and around them so that when the compound cools and hardens the jars will be firmly imbedded so that they cannot move or break, and in the event of a jar cracking it will still be prevented from leaking by the compound fitting firmly and closely to the jar.

In order to prevent the jars from sinking in the compound upon softening of the latter in hot weather, use is made of a suitable support 12 upon which the jars rest directly. This support may consist of strips of wood, rubber or other suitable material capable of serving as a spacer. It is to be noted that the grounding strip 5 is of laminated construction. This is preferable to solid construction inasmuch as the strip is more readily bent when the necessity of the renewal of positive plates arises. The negative conductor 12 is the only wire from the battery. Obviously this is connected to the negative terminal of the battery and since there is only one wire from the battery there can be no mistake in making connections.

The advantages of the battery are these: The case 1 is employed as the positive connection of the battery. It has been pointed out that the case itself is practically the equivalent of the positive terminal of the battery in that this terminal is grounded to the case by the strip 5. In order to make the positive connection of the battery in the circuit which it is intended to energize it is only necessary to either set or suspend the battery case upon or from the framework of the motor vehicle. The hangers 9 are provided for the latter purpose.

By coating the iron box 2 of which the case is constructed with a cover 3 of lead the case is rendered acid-proof. The iron box is constructed of one piece of metal. It is intended to be seamless and perfectly rigid so as to reduce the likelihood of the casing yielding with the movement of the motor vehicle and thereby causing a breaking of the battery jars and resulting leakage of the fluid. Additional protection is afforded by partially molding the rubber jars 10 into the battery. The compound 11 covers all sides and the bottoms of the jars not only holding them rigid and to prevent leakage but also providing a cushion to protect the jars from vibration and possible outside blows.

There is nothing about the improved battery to absorb moisture, this being one of the faults of batteries of present construction which usually have a wood case by which the cells are contained. Upon spilling of any of the electrolyte the wood case in time becomes soaked, presenting the possibility of short circuits and other difficulties. By making the case 1 of metal and filling it with a hot compound a perfectly tight joint is made all around so that no electrolyte can get into the box proper even should some be spilled in filling the jars.

By virtue of the fact that the lead coating 3 stops short of the bottom of the box on the inside (Fig. 2) the resulting edge of the coating forms an offset which, in a measure, holds the compound 11 in place. An additional advantage of the foregoing is that there is nothing about the new battery construction which can preclude the ready adoption thereof by the manufacturers of batteries of the present type. The jars, cover, plates, separators, etc., are not changed in construction, the principal improvement being in the battery case itself.

While the construction and arrangement of the improved storage battery is that of a generally preferred form, obviously modifications and changes may be made without departing from the spirit of the invention or the scope of the claims.

I claim:—

1. A storage battery having a metallic box, an electrolytic cell contained by the box, a lead coating for the box, connecting means for grounding one of the terminals of the cell to said lead coating, and means including hangers by which electrical connection of said grounded terminal may be made with a metallic support, for example the chassis of a motor vehicle.

2. A storage battery comprising a rigid, seamless, box of metal including iron, and a cover of lead to protect the box from corrosion, said cover being applied outside of the box and carried over the edge to the inside for a predetermined distance.

3. A storage battery comprising a rigid, seamless box of metal including iron, a cover of lead to protect the box from corrosion, said cover being applied outside of the box and carried over the edge to the inside for a predetermined distance, a battery jar situated in the box, and a filling of compound in the box substantially flush with the upper edge covering said jar on the bottom and sides and holding the jar in a rigid position.

4. A storage battery comprising a metallic container, a cell situated in the container, means by which one of the terminals of the cell is permanently grounded upon the metallic container, and means attached to the container by which an electrical connection may be made to a circuit in which the battery is intended to be used, said means including a plurality of hangers by which the battery may be hung thereby providing its own support.

5. A storage battery comprising a metallic container, a cell situated in the container, means by which one of the terminals of the cell is permanently grounded upon the metallic container, means attached to the container by which an electrical connection may be made to a circuit in which the battery is intended to be used, said means including a plurality of hangers by which the battery may be hung thereby providing its own support, and separate handles affixed to the container providing for the ready conveyance of the battery regardless of said hangers.

6. A storage battery comprising a container, a cell situated in the container, a filling of compound in the container around the bottom and sides of the cell holding the latter rigidly in place, and spacing means situated between the bottom of the cell and the bottom of the container holding the cell in the desired position and preventing sinking thereof upon possible warming and softening of the compound.

7. A storage battery comprising a metallic container, a cell situated in the container, and means for permanently connecting one terminal of the cell to the metallic container, said means including a grounding strip of laminated material affixed to the container.

8. A storage battery comprising a cell, an insulating envelope in which the cell is held, a casing of conducting material in which the cell and said envelope are situated, and means connecting one terminal of the cell with said container constituting the latter one connection of an electrical circuit in which the battery may be situated.

9. A storage battery comprising a metallic container, a cell situated in the container, means permanently connecting one terminal of the cell with the container, and a single conducting wire leading off from the opposite terminal of the cell.

ARTHUR MARTIN SMALL.